United States Patent
Kim et al.

(10) Patent No.: US 11,631,270 B2
(45) Date of Patent: Apr. 18, 2023

(54) METHODS AND SYSTEMS FOR DETECTING DUPLICATE DOCUMENT USING DOCUMENT SIMILARITY MEASURING MODEL BASED ON DEEP LEARNING

(71) Applicant: NAVER CORPORATION, Gyeonggi-do (KR)

(72) Inventors: Sung Min Kim, Seongnam-si (KR); Byeonghoon Han, Seongnam-si (KR)

(73) Assignee: NAVER CORPORATION, Gyeonggi-Do (KR)

(*) Notice: Subject to any disclaimer, the term of this patent is extended or adjusted under 35 U.S.C. 154(b) by 215 days.

(21) Appl. No.: 17/119,028

(22) Filed: Dec. 11, 2020

(65) Prior Publication Data
US 2021/0182551 A1 Jun. 17, 2021

(30) Foreign Application Priority Data
Dec. 11, 2019 (KR) .......................... 10-2019-0164926

(51) Int. Cl.
*G06V 30/418* (2022.01)
*G06F 16/93* (2019.01)
(Continued)

(52) U.S. Cl.
CPC ............ *G06V 30/418* (2022.01); *G06F 16/93* (2019.01); *G06F 40/194* (2020.01); *G06K 9/6215* (2013.01)

(58) Field of Classification Search
CPC ...... G06V 30/418; G06V 30/40; G06F 16/93; G06F 40/30; G06F 40/205; G06F 40/279; G06K 9/6215; G06N 3/08
See application file for complete search history.

(56) References Cited

U.S. PATENT DOCUMENTS 10,891,334 B2* 1/2021 Koutrika ................. G06F 16/93
11,170,177 B2* 11/2021 Dowell .................... G06F 40/35
(Continued)

FOREIGN PATENT DOCUMENTS

JP           4919515 B2   4/2012
KR  10-2010-0008466 A    1/2010
(Continued)

OTHER PUBLICATIONS

Gao, Jin, Yahao He, Xiaoyan Zhang, and Yamei Xia. "Duplicate short text detection based on Word2vec." In 2017 8th IEEE International Conference on Software Engineering and Service Science (ICSESS), pp. 33-37. IEEE, 2017. (Year: 2017).

(Continued)

*Primary Examiner* — Keith D Bloomquist
(74) *Attorney, Agent, or Firm* — Harness, Dickey & Pierce, P.L.C.

(57) ABSTRACT

Disclosed is a method and system, the method including extracting similar and dissimilar document pair sets from a document database, the similar document pair set including similar document pairs having a common attribute, and the dissimilar document pair set including dissimilar document pairs extracted randomly, calculating a mathematical similarity for each of the similar and dissimilar document pairs using a mathematical measure to obtain a first and second mathematical similarities, calculating a semantic similarity for each of the similar and dissimilar document pairs to obtain a first and second semantic similarities, the first semantic similarities being higher than the first mathematical similarities, and the second semantic similarities being lower than the second mathematical similarities, training a similarity model based on the similar and dissimilar document pairs, and the first and second semantic similarities to (Continued)

obtain a trained similarity model, and detecting a duplicate document using the trained similarity model.

18 Claims, 5 Drawing Sheets

(51) Int. Cl.
*G06K 9/62* (2022.01)
*G06F 40/194* (2020.01)

(56) References Cited

U.S. PATENT DOCUMENTS

| | | | |
|---|---|---|---|
| 11,216,619 B2* | 1/2022 | Yu | G06N 5/04 |
| 11,233,761 B1 | 1/2022 | Gusev et al. | |
| 2002/0016787 A1* | 2/2002 | Kanno | G06F 16/30 |
| | | | 707/999.005 |
| 2004/0064449 A1* | 4/2004 | Ripley | G06F 16/2455 |
| | | | 707/999.005 |
| 2006/0294101 A1 | 12/2006 | Wnek | |
| 2010/0331146 A1* | 12/2010 | Kil | G06Q 30/02 |
| | | | 482/8 |
| 2011/0055332 A1* | 3/2011 | Stein | G06Q 10/107 |
| | | | 382/218 |
| 2011/0087668 A1 | 4/2011 | Thomas et al. | |
| 2012/0323968 A1* | 12/2012 | Yih | G06F 16/31 |
| | | | 707/E17.069 |
| 2016/0292062 A1 | 10/2016 | Bommaraju et al. | |
| 2018/0075138 A1 | 3/2018 | Perram et al. | |

FOREIGN PATENT DOCUMENTS

| | | |
|---|---|---|
| KR | 101626247 B1 | 6/2016 |
| KR | 2019-0043604 A | 4/2019 |
| WO | WO-2006/119578 A1 | 11/2006 |
| WO | WO-2014/206241 A1 | 12/2014 |

OTHER PUBLICATIONS

Oghbaie, Marzieh, and Morteza Mohammadi Zanjireh. "Pairwise document similarity measure based on present term set." Journal of Big Data 5, No. 1 (2018): 1-23. (Year: 2018).

Zhang, Dell, Jun Wang, Deng Cai, and Jinsong Lu. "Self-taught hashing for fast similarity search." In Proceedings of the 33rd international ACM SIGIR conference on Research and development in information retrieval, pp. 18-25. 2010. (Year: 2010).

Korean Office Action dated Dec. 30, 2021 by the Korean Patent Office corresponding to Korean patent application No. 10-2019-0169132.

Korean Office Action dated Jun. 11, 2021 by the Korean Patent Office corresponding to Korean patent application No. 10-2019-0169132.

Liu, S. et al.: "Accurate Deep Representation Quantization with Gradient Snapping Layer for Similarity Search" Association for the Advancement of Artificial Intelligence, 2017, pp. 1-7, XP055801305. Retrieved from the Internet: URL: https://arxiv.org/pdf/1610.09645. pdf I retrieved on 2021-05-261.

Yoshihama, S. et al.: "Web-based Data Leakage Prevention" Yokohama National University, 2011, XPO55234468, Retrieved from the Internet: URL: http://citeseerx.ist.psu.edu/viewdoc/download ;jsession id=5AO5OA63CB61 A931349DB6FACE E97D9E?doi=10.1. 1.207.5902&rep=repl&type=pdf [retrieved on May 26, 2021].

Gao L. et al.: "Learning in High-Dimensional Multimedia Data: The State of the Art", Cornell University Library, 2017, XPO80775509, DOI: 10.1007/800530-015-0494-1 [retrieved on May 26, 2021.

Extended European Search Report dated May 17, 2021, corresponding to European Patent Application No. 20214492.9-1213.

Office Action dated Dec. 21, 2021 for corresponding U.S. Appl. No. 17/120,693.

Office Action dated Jul. 8, 2022 for corresponding U.S. Appl. No. 17/120,693.

Notice of Allowance dated Oct. 6, 2022 for corresponding U.S. Appl. No. 17/120,693.

Korean Office Action dated Mar. 17, 2022 corresponding to Korean Patent Application No. 10-2019-0164926.

Silva, R. F. G. et al. "Duplicate Question Detection in Stack Overflow—A Reproducibility Study" IEEE, 2018, p. 572-581.

Korean Office Action dated Sep. 7, 2022 for corresponding Korean patent application No. 10-2022-0059733.

Jaehwan Jeong et al., "Methodology of Developing Train Set for BERT'S Sentence Similarity Classification with Lexical Mismatch", Proceedings ofthe 31st Annual Conference on Human and Cognitive Language Technology, pp. 265-271, Oct. 11, 2019.

Wang Liting et al.: Detecting Duplicate Questions in Stack Overflow via Deep Learning Approaches, 2019 26th Asia-Pacific Software Engineeringconference (APSEC), IEEE, Dec. 2, 2019 (Dec. 2, 2019), pp. 506-513.

European Search Report dated Apr. 29, 2021 by the EPO corresponding to European Patent Application No. 20213229.6.

* cited by examiner

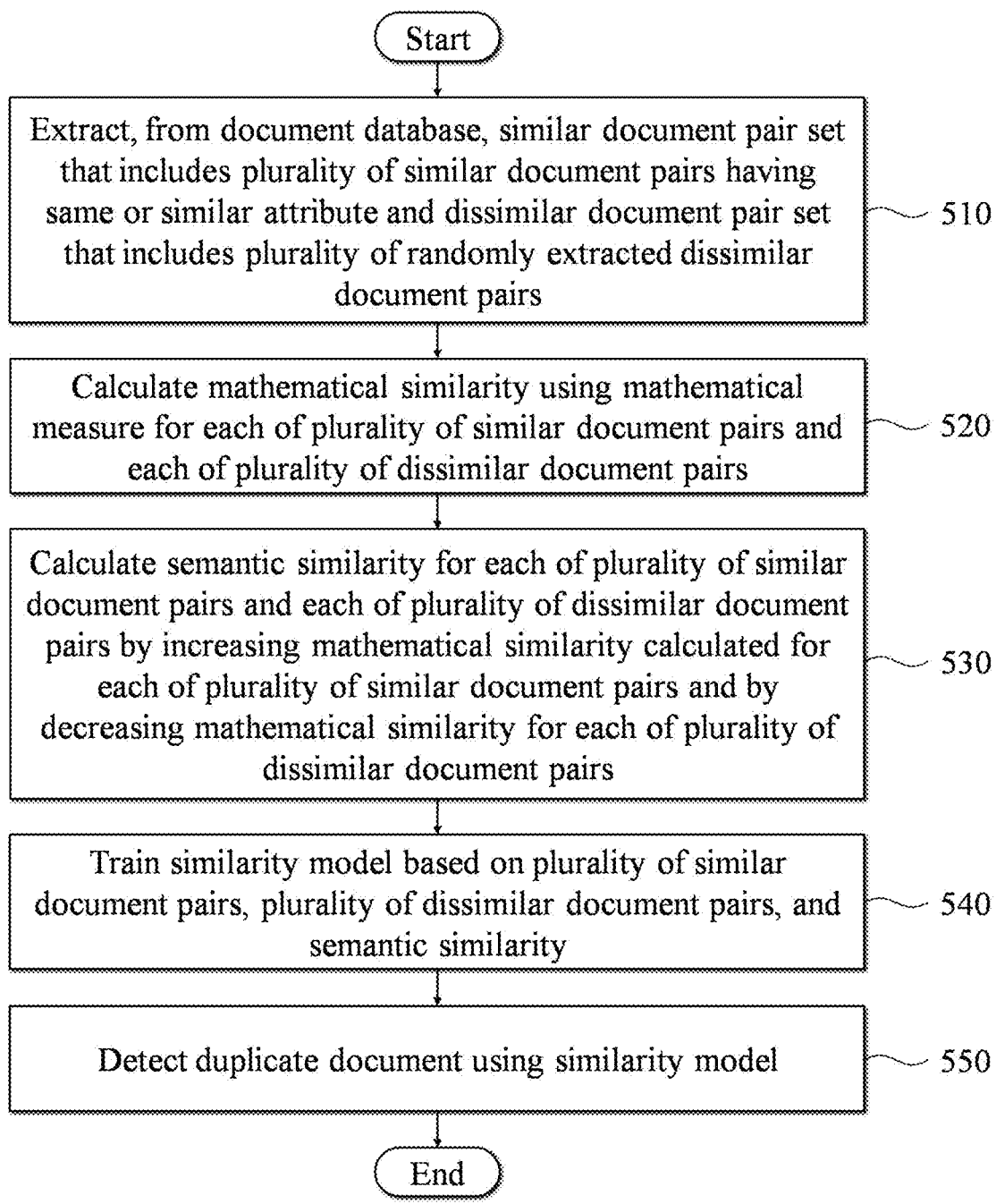

METHODS AND SYSTEMS FOR DETECTING DUPLICATE DOCUMENT USING DOCUMENT SIMILARITY MEASURING MODEL BASED ON DEEP LEARNING

CROSS-REFERENCE TO RELATED APPLICATIONS

This U.S. non-provisional application and claims the benefit of priority under 35 U.S.C. § 119 to Korean Patent Application No. 10-2019-0164926, filed Dec. 11, 2019, the entire contents of which are incorporated herein by reference in their entirety.

TECHNICAL FIELD

Some example embodiments relate to a method and system for detecting a duplicate document using a similarity measuring model based on deep learning.

RELATED ART

In general, a method of measuring a similarity between texts divides a text into token units, such as a morpheme, a character, and an N-gram, and measures a similarity using a mathematical measure, such as, for example, a cosine similarity, a Euclidean distance, and a Jaccard similarity. For example, technology exists for an online plagiarized document detection system using a synonym dictionary. The online plagiarized document detection system performs a preprocessing process of dividing an original document and a document to be inspected based on a word unit, and storing the same in a database with a representative synonym retrieved from a synonym dictionary; a process of selecting, from the original document, a first document similar to the document to be inspected based on a Jaccard coefficient-based similarity; and a process of selecting, from the first document, a second document similar to the document to be inspected based on a cosine distance-based similarity.

However, in the case of measuring a similarity using a mathematical measure as above, the similarity may be overestimated due to accidental match of an unimportant part between texts although the texts have different meanings. Alternatively, the similarity may be underestimated due to mismatch of a non-critical part between the texts although the texts have similar meaning. For example, although a semantic similarity between a first text "ha ha ha ha Let's hang on" and a second text "ha ha ha ha Let's hang out" is low, a similarity between the first text and the second text may be overestimated due to accidental match of an unimportant part "ha ha ha ha Let's hang" in terms of the mathematical measure. As another example, although a semantic similarity between a third text "ha ha ha ha ha ha ha, Cheer up" and a fourth text "Cheer up" is high, a similarity between the third text and the fourth text may be underestimated due to mismatch of an unimportant part "ha ha ha ha ha ha ha," in terms of the mathematical measure.

That is, the similarity measured according to the mathematical measure simply provides a value representing a number of similar characters present between two texts and calculates an indiscriminate value about a semantic similarity between the two texts.

SUMMARY

Some example embodiments provide a method and system for detecting a duplicate document that may determine whether a duplicate part is present between documents based on a semantic similarity between the documents.

According to an aspect of some example embodiments, there is provided a duplicate document detection method of a computer apparatus including processing circuitry, the method including extracting, by the processing circuitry, a similar document pair set and a dissimilar document pair set from a document database, the similar document pair set including a plurality of similar document pairs having a common attribute, and the dissimilar document pair set including a plurality of dissimilar document pairs extracted randomly, calculating, by the processing circuitry, a mathematical similarity for each of the plurality of similar document pairs and each of the plurality of dissimilar document pairs using a mathematical measure to obtain a first plurality of mathematical similarities based on the plurality of the similar document pairs and a second plurality of mathematical similarities based on the plurality of dissimilar document pairs, calculating, by the processing circuitry, a semantic similarity for each of the plurality of similar document pairs and each of the plurality of dissimilar document pairs to obtain a first plurality of semantic similarities based on the plurality of similar document pairs and a second plurality of semantic similarities based on the plurality of dissimilar document pairs, each of the first plurality of semantic similarities being higher than a corresponding one of the first plurality of mathematical similarities, and each of the second plurality of semantic similarities being lower than a corresponding one of the second plurality of mathematical similarities, training, by the processing circuitry, a similarity model based on the plurality of similar document pairs, the plurality of dissimilar document pairs, the first plurality of semantic similarities and the second plurality of semantic similarities to obtain a trained similarity model, and detecting, by the processing circuitry, a duplicate document using the trained similarity model.

The attribute may include at least one of an author of a document, a post section of the document, or a registration time range of the document.

The calculating of the semantic similarity may include calculating the first plurality of semantic similarities by inputting the first plurality of mathematical similarities to a first nonlinear function, and calculating the second plurality of semantic similarities by inputting the second plurality of mathematical similarities to a second nonlinear function and the first nonlinear function outputs a value greater than a value output by the second nonlinear function based on any value input to both the first nonlinear function and the second nonlinear function.

The training of the similarity model may include sequentially inputting each of the plurality of similar document pairs and each of the plurality of dissimilar document pairs to the similarity model as a respective input document pair, and training the similarity model to minimize a mean squared error (MSE) between each respective output value of the similarity model and a corresponding semantic similarity among the first plurality of semantic similarities and the second plurality of semantic similarities corresponding to the respective input document pair.

The detecting of the duplicate document may include extracting a plurality of candidate document pairs from a document set in which a duplicate is to be detected, calculating a respective semantic similarity of each of the plurality of candidate document pairs by sequentially inputting each of the plurality of candidate document pairs to the similarity model, and determining one of the plurality of candidate document pairs for which the respective semantic similarity is greater than or equal to a threshold as including duplicate documents.

The extracting the plurality of candidate document pairs may include extracting a plurality of subsets among subsets of the document set as the plurality of candidate document pairs, each of the plurality of subsets having two elements.

The detecting of the duplicate document may include extracting a plurality of candidate document pairs that each include a respective document among a plurality of registered documents and a new document in response to a request for registering the new document, calculating a respective semantic similarity of each of the plurality of candidate document pairs by sequentially inputting each of the plurality of candidate document pairs to the similarity model, determining one or more of the plurality of candidate document pairs for which the respective semantic similarity is greater than or equal to a first threshold as representing one or more duplicate document determinations, and determining the new document to be the duplicate document based on a number of the one or more duplicate document determinations being greater than or equal to a second threshold.

The method may further include displaying a Completely Automated Public Turing test to tell Computers and Humans Apart (CAPTCHA) instead of registering the new document in response to determining the new document is the duplicate document.

The mathematical measure may be at least one of a cosine similarity, a Euclidean distance, or a Jaccard similarity.

According to an aspect of some example embodiments, there is provided a non-transitory computer-readable record medium storing instructions that, when executed processing circuitry, cause the processing circuitry to perform the method.

According to an aspect of some example embodiments, there is provided a computer apparatus including processing circuitry configured to cause the computer apparatus to extract a similar document pair set and a dissimilar document pair set from a document database, the similar document pair set including a plurality of similar document pairs having a common attribute, and the dissimilar document pair set including a plurality of dissimilar document pairs extracted randomly, calculate a mathematical similarity using for each of the plurality of similar document pairs and each of the plurality of dissimilar document pairs using a mathematical measure to obtain a first plurality of mathematical similarities based on the plurality of the similar document pairs and a second plurality of mathematical similarities based on the plurality of dissimilar document pairs, calculate a semantic similarity for each of the plurality of similar document pairs and each of the plurality of dissimilar document pairs to obtain a first plurality of semantic similarities based on the plurality of similar document pairs and a second plurality of semantic similarities based on the plurality of dissimilar document pairs, each of the first plurality of semantic similarities being higher than a corresponding one of the first plurality of mathematical similarities, and each of the second plurality of semantic similarities being lower than a corresponding one of the second plurality of mathematical similarities, train a similarity model based on the plurality of similar document pairs, the plurality of dissimilar document pairs, the first plurality of semantic similarities and the second plurality of semantic similarities to obtain a trained similarity model, and detect a duplicate document using the trained similarity model.

According to some example embodiments, it is possible to determine whether a duplicate part is present between documents based on a semantic similarity between the documents.

Further areas of applicability will become apparent from the description provided herein. The description and specific examples in this summary are intended for purposes of illustration only and are not intended to limit the scope of the present disclosure.

BRIEF DESCRIPTION OF DRAWINGS

FIG. 5 is a flowchart illustrating an example of a duplicate document detection method according to some example embodiments.

DETAILED DESCRIPTION

Figure 1:
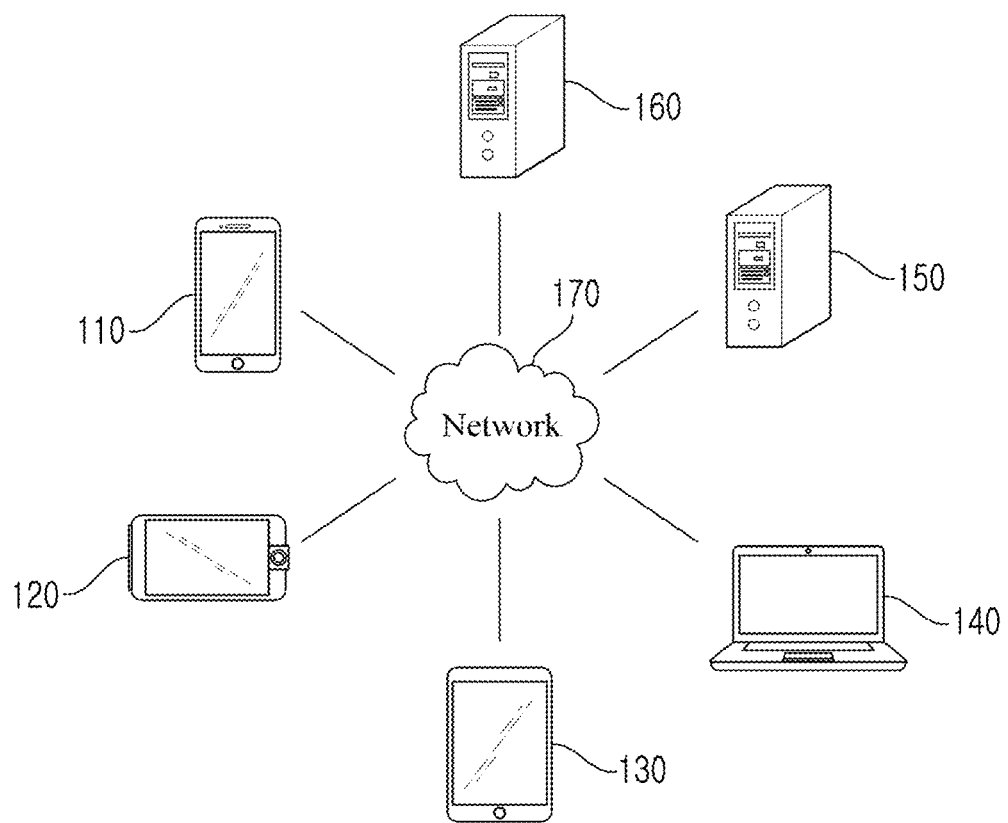
FIG. 1 is a diagram illustrating an example of a network environment according to some example embodiments.

Some example embodiments will be described in detail with reference to the accompanying drawings. Some example embodiments, however, may be embodied in various different forms, and should not be construed as being limited to only the illustrated examples. Rather, the illustrated examples are provided so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, operations, elements, and/or components, but do not preclude the presence or addition of one or more other features, integers, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

Unless otherwise defined, all terms (including technical and scientific terms) used herein have the same meaning as, or a similar meaning to, that commonly understood by one of ordinary skill in the art to which some example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned herein. Examples of program code include both machine code produced by a compiler and higher level program code that is executed using an interpreter.

A hardware device, such as a computer processing device, may run an operating system (OS) and one or more software applications that run on the OS. The computer processing device also may access, store, manipulate, process, and create data in response to execution of the software. For simplicity, some example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of some example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, some example embodiments will be described with reference to the accompanying drawings.

A duplicate document detection system according to some example embodiments may be implemented by at least one computer apparatus, and a duplicate document detection method according to some example embodiments may be performed through at least one computer apparatus included in the duplicate document detection system. Here, a computer program according to some example embodiments may be installed and executed on the computer apparatus, and the computer apparatus may perform the duplicate document detection method under control of the executed computer program. The computer program may be stored in a non-transitory computer-readable record medium to implement the duplicate document detection method on a computer in conjunction with the computer apparatus.

FIG. 1 illustrates an example of a network environment according to some example embodiments. Referring to FIG. 1, the network environment may include a plurality of electronic devices 110, 120, 130, and/or 140, a plurality of servers 150 and/or 160, and/or a network 170. FIG. 1 is provided as an example only. A number of electronic devices or a number of servers is not limited thereto. Also, the network environment of FIG. 1 is provided as an example only among environments applicable to some example embodiments. An environment applicable to some example embodiments is not limited to the network environment of FIG. 1.

Each of the plurality of electronic devices 110, 120, 130, and/or 140 may be a fixed terminal or a mobile terminal that is configured as a computer apparatus. For example, the plurality of electronic devices 110, 120, 130, and/or 140 may be a smartphone, a mobile phone, a navigation device, a computer, a laptop computer, a digital broadcasting terminal, a personal digital assistant (PDA), a portable multimedia player (PMP), a tablet personal computer (PC), and/or the like. For example, although FIG. 1 illustrates a shape of a smartphone as an example of the electronic device 110, the electronic device 110 used herein may refer to one of various types of physical computer apparatuses capable of communicating with other electronic devices 120, 130, and 140, and/or the servers 150 and 160 over the network 170 in a wireless or wired communication manner. The communication scheme is not limited and may include a near field wireless communication scheme between devices as well as a communication scheme using a communication network (e.g., a mobile communication network, wired Internet, wireless Internet, a broadcasting network, etc.) includable in the network 170. For example, the network 170 may include at least one of network topologies that include a personal area network (PAN), a local area network (LAN), a campus area network (CAN), a metropolitan area network (MAN), a wide area network (WAN), a broadband network (BBN), and Internet. Also, the network 170 may include at least one of network topologies that include a bus network, a star network, a ring network, a mesh network, a star-bus network, a tree or hierarchical network, and the like. However, they are provided as examples only.

Each of the servers 150 and 160 may be configured as a computer apparatus or a plurality of computer apparatuses that provides an instruction, a code, a file, content, a service, etc., through communication with the plurality of electronic devices 110, 120, 130, and/or 140 over the network 170. For example, the server 150 may be a system that provides a service to the plurality of electronic devices 110, 120, 130, and/or 140 connected over the network 170. Here, the service may include, for example, a content providing service, a group call service or an audio conferencing service, a messaging service, a mail service, a social network service (SNS), a map service, a translation service, a financial service, a payment service, and/or a search service.

Figure 2:
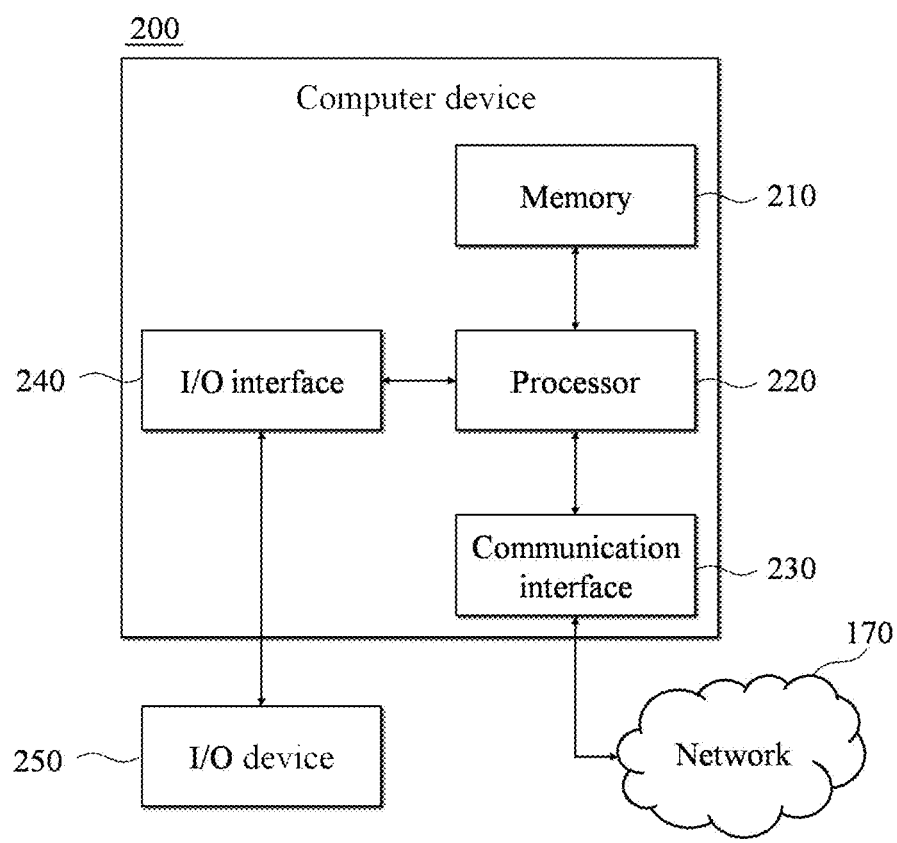
FIG. 2 is a diagram illustrating an example of a computer apparatus according to some example embodiments.

FIG. 2 is a block diagram illustrating an example of a computer apparatus according to some example embodiments. Each of the plurality of electronic devices 110, 120, 130, and/or 140, and/or each of the servers 150 and/or 160, may be implemented by a computer apparatus 200 of FIG. 2.

Referring to FIG. 2, the computer apparatus 200 may include a memory 210, a processor 220, a communication interface 230, and/or an input/output (I/O) interface 240. The memory 210 may include a permanent mass storage device, such as a random access memory (RAM), a read only memory (ROM), and/or a disk drive, as a non-transitory computer-readable storage medium. The permanent mass storage device, such as the ROM and disk drive, may be included in the computer apparatus 200 as a permanent storage device separate from the memory 210. Also, an OS and at least one program code may be stored in the memory 210. The software components may be loaded to the memory 210 from another non-transitory computer-readable medium separate from the memory 210. The other non-transitory computer-readable storage medium may include a non-transitory computer-readable storage medium, for example, a floppy drive, a disk, a tape, a DVD/CD-ROM drive, a memory card, etc. According to some example embodiments, software components may be loaded to the memory 210 through the communication interface 230 instead of, or in addition to, the non-transitory computer-readable storage medium. For example, software components may be loaded to the memory 210 of the computer apparatus 200 based on a computer program installed by files received over the network 170.

The processor 220 may be configured to process computer-readable instructions of a computer program by performing basic arithmetic operations, logic operations, and I/O operations. The computer-readable instructions may be provided from the memory 210 or the communication interface 230 to the processor 220. For example, the processor 220 may be configured to execute received instructions in response to the program code stored in the storage device, such as the memory 210.

The communication interface 230 may provide a function for communication between the computer apparatus 200 and another apparatus, for example, the aforementioned storage devices, over the network 170. For example, the processor 220 of the electronic apparatus 200 may transfer data, a file, a request or an instruction created based on the program code stored in the storage device, such as the memory 210, to other apparatuses over the network 170 under control of the communication interface 230. Inversely, a signal, an instruction, data, a file, etc., from the other apparatus may be received at the computer apparatus 200 through the communication interface 230 of the computer apparatus 200 by going through the network 170. For example, a signal, an instruction, data, etc., received through the communication interface 230 may be transferred to the processor 220 or the memory 210, and a file, etc., may be stored in a storage medium, for example, the permanent mass storage device, further includable in the computer apparatus 200.

The I/O interface 240 may be a device used for interface with an I/O apparatus 250 (e.g., an input device and/or an output device). For example, an input device may include a device, such as a microphone, a keyboard, a mouse, and the like, and an output device may include a device, such as a display, a speaker, and the like. As another example, the I/O interface 240 may be a device for interface with an apparatus in which an input function and an output function are integrated into a single function, such as a touchscreen. The I/O apparatus 250 may be configured as a single apparatus with the computer apparatus 200.

According to some example embodiments, the computer apparatus 200 may include a number of components greater than or less than a number of components shown in FIG. 2. However, some conventional components are not illustrated in detail. For example, the computer apparatus 200 may be configured to include at least a portion of the I/O apparatus 250 or may further include other components, such as, a transceiver and a database.

The term "document" used herein may include a post uploaded on a web (e.g., the Internet) by any author, such as, for example, a blog listing, a news article, and/or a comment. Also, the term "attribute" refers to a predefined or alternatively, given feature and may be determined based on (e.g., may include) at least one of an author of a document, a post section of the document, and/or a registration time range of the document. Here, the post section of the document may be based on sections on which documents are displayed at a single service. For example, that post sections of two documents are identical or similar may represent that the two posts are posted on the same post section, or similar post sections, among a plurality of post sections on which documents are displayed at a single service. For example, as sections for posting a document to a specific blog, a posting section for "movie", a posting section for "music", and a posting section for "book" may be included. The posting sections of documents may be variously set for each service to which the document is posted. When an author is defined as an attribute, two different blog listings of the same author, or similar authors, may be recognized as documents of the same attributes or similar attributes. As another example, when an author, a post section, and a 1-hour range are defined as attributes, two comments registered on the same post section, or similar post sections, by the same author, or similar authors, within 1 hour may be recognized as documents of the same attributes or similar attributes. Also, the term "duplicate" between documents used herein may represent that two documents have a semantic similarity greater than or equal to a threshold. For example, with the assumption that a value of a semantic similarity between documents is represented as the range of 0.00 to 1.00 and a threshold for "duplicate" is 0.95, if a value of a semantic similarity between a document 1 and a document 2 is 0.97, the document 1 and the document 2 may be determined to be duplicate documents.

Figure 3:
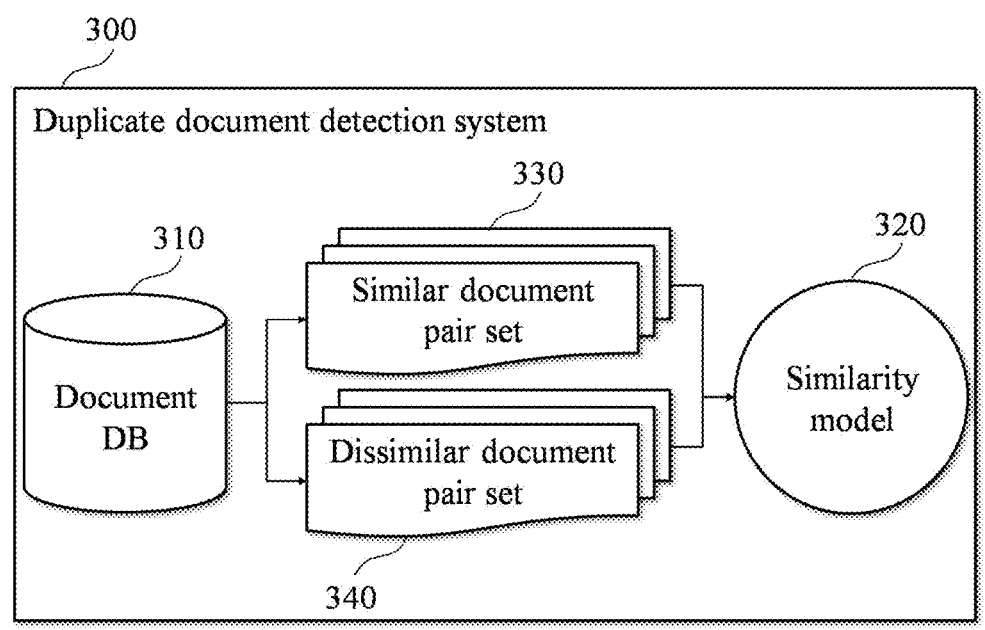
FIG. 3 illustrates an example of a process of training a similarity model according to some example embodiments.

FIG. 3 illustrates an example of a process of training a similarity model according to some example embodiments. A duplicate document detection system 300 may be implemented by the aforementioned computer apparatus 200 and may process the following similarity model training process under control of the processor 220 included in the computer apparatus 200.

The duplicate document detection system 300 may determine whether a duplicate part is present between documents included in a document database (DB) 310. To this end, the duplicate document detection system 300 may train a similarity model 320.

The document DB 310 may be included in a physical apparatus (a first apparatus, e.g., the server 150) that implements the duplicate document detection system 300 and configured to provide documents. Also, the document DB 310 may be configured in another physical apparatus (a second apparatus, e.g., server 160) outside the duplicate document detection system 300 and configured to provide documents in a form that the first apparatus and the second apparatus communicate with each other through the network 170.

The duplicate document detection system 300 may extract a similar document pair set 330 and a dissimilar document pair set 340 from the document DB 310. Here, the similar document pair set 330 denotes a set of document pairs each of which having a same or similar predefined or alternatively, given attribute (e.g., an attribute common to the set of documents and having the same or similar values in the set of documents, may also be referred to herein as a common attribute) and the dissimilar document pair set 340 denotes a set of document pairs randomly extracted (e.g., randomly paired) without considering an attribute. Depending on some example embodiments, the dissimilar document pair set 340 denotes a set of document pairs each of which having a different a predefined or alternatively, given attribute (e.g., an attribute common to the set of documents that has different values in the set of documents).

In one experiment example, 35 million "document pairs created within 1 hour in the same post section by the same author," which is a document pair of a predefined or alternatively, given attribute, were extracted from among 140 million comments as the similar document pair set 330 and 35 million document pairs each including any two comments were extracted from among 140 million comments as the dissimilar document pair set 340. Here, hypothesis 1 is that, as a number of extractions of two comments infinitely increases, a semantic similarity probability $\alpha$ between two comments of the same attribute, or similar attributes, is greater than a semantic similarity probability $\beta$ between randomly extracted two comments. Hypothesis 2 is that, with the assumption that a value of a similarity (hereinafter, a mathematical similarity) using a mathematical measure is identical or similar, a mathematical similarity between two comments of the same attribute, or a similar attribute, is likely to be underestimated by the mathematical measure and a mathematical similarity between randomly extracted two comments is likely to be overestimated by the mathematical measure. For example, the proportion of cases in which a semantic/subjective similarity is present between two comments of the same attribute, or similar attributes, having the mathematical similarity of 0.2 or less was high. Conversely, the proportion of cases in which a semantic/subjective similarity is absent between arbitrarily extracted two comments of which the mathematical similarity is 0.7 or more was high.

Based on the above verified hypotheses, the duplicate document detection system 300 according to some example embodiments may calculate a mathematical similarity using a mathematical measure for each of the similar document pairs of the similar document pair set 330 and each of the dissimilar document pairs of the dissimilar document pair set 340. Here, the duplicate document detection system 300 may determine a semantic similarity for each of document pairs by increasing or decreasing the calculated mathematical similarity depending on whether an attribute is identical or similar. For example, a mathematical similarity calculated for each of the similar document pairs of the similar document pair set 330 may be regarded as (e.g., may be considered as indicating) that a value of the mathematical similarity is underestimated, and a semantic similarity may be calculated by appropriately increasing a value of the calculated mathematical similarity. Conversely, a mathematical similarity calculated for each of the dissimilar document pairs of the dissimilar document pair set 340 may be regarded as (e.g., may be considered as indicating) that a value of the mathematical similarity is overestimated, and a semantic similarity may be calculated by appropriately decreasing a value of the calculated mathematical similarity.

In detail, for example, the duplicate document detection system 300 may increase a value of a mathematical similarity of a similar document pair by inputting the value of the mathematical similarity of the similar document pair to a first nonlinear function, and may decrease a value of a mathematical similarity of a dissimilar document pair by inputting the value of the mathematical similarity of the dissimilar document pair to a second nonlinear function. The first nonlinear function may increase a value of an underestimated mathematical similarity with respect to a similar document pair, and the second nonlinear function may decrease a value of an overestimated mathematical similarity with respect to a dissimilar document pair. In the case of two nonlinear functions meeting a condition in which the first nonlinear function calculates a value greater than that of the second nonlinear function with respect to all of the same input values or similar input values, the two nonlinear functions may be used as the first nonlinear function and the second nonlinear function (e.g., the first nonlinear function may output a value greater than a value output by the second nonlinear function based on any value input to both the first nonlinear function and the second nonlinear function).

A semantic similarity calculated for document pairs (e.g., using the first nonlinear function and the second nonlinear function) may be regarded as a correct answer score for the similarity model 320. For example, the duplicate document detection system 300 may train the similarity model 320 using the similar document pair set 330, the dissimilar document pair set 340, and the correct answer score as learning data. For example, the similarity model 320 may be trained to calculate a semantic similarity for an input document pair.

In detail, for example, the similarity model 320 may be trained such that an output value for input document pairs (e.g., a semantic similarity determined using the similarity model 320) may minimize a mean squared error (MSE), or represent a lowest MSE, with the correct answer score (e.g., the calculated semantic similarity). For example, the similarity model 320 may be trained to minimize or lower a loss by inputting the output value and the correct answer score to a loss function using the MSE. At least one of known deep learning models may be used as the similarity model 320. For example, a convolutional neural network (CNN) or a recurrent neural network (RNN) may be used to implement the similarity model 320. In this case, the similarity model 320 may be configured to receive a document pair and to output a real number (a semantic similarity) in the range of 0 to 1. The range of an output value is provided as an example only and is not limited to the range of 0 to 1. In some example embodiments, the duplicate document detection system 300 may perform some operations (e.g., the operations described herein as being performed training, using and/or implementing the similarity model 320) by artificial intelligence and/or machine learning. As an example, the duplicate document detection system 300 may implement an artificial neural network (e.g., the similarity model 320) that is trained on a set of training data by, for example, a supervised, unsupervised, and/or reinforcement learning model, and wherein the duplicate document detection system 300 may process a feature vector to provide output based upon the training. Such artificial neural networks may utilize a variety of artificial neural network organizational and processing models, such as CNNs, RNNs optionally including long short-term memory (LSTM) units and/or gated recurrent units (GRU), stacking-based deep neural networks (S-DNN), state-space dynamic neural networks (S-SDNN), deconvolution networks, deep belief networks (DBN), and/or restricted Boltzmann machines (RBM). Alternatively or additionally, the duplicate document detection system 300 may include other forms of artificial intelligence and/or machine learning, such as, for example, linear and/or logistic regression, statistical clustering, Bayesian classification, decision trees, dimensionality reduction such as principal component analysis, and expert systems; and/or combinations thereof, including ensembles such as random forests.

The trained similarity model 320 may be used (e.g., by the duplicate document detection system 300) to detect a duplicate between documents. For example, if a plurality of comments is registered and, in this state, an author requests registration of a new comment, the duplicate document detection system 300 may detect comments that duplicate the new comment. Here, if N or more duplicate comments are detected, the duplicate document detection system 300 may prevent or reduce indiscriminate registration of a new duplicate comment by displaying a Completely Automated Public Turing test to tell Computers and Humans Apart (CAPTCHA). For example, a system providing a social media service may include the duplicate document detection system 300. In this case, the system providing the social media service may detect and prevent duplicate documents or duplicate comments posted on the social media service in real time by using the duplicate document detection system 300.

Figure 4:
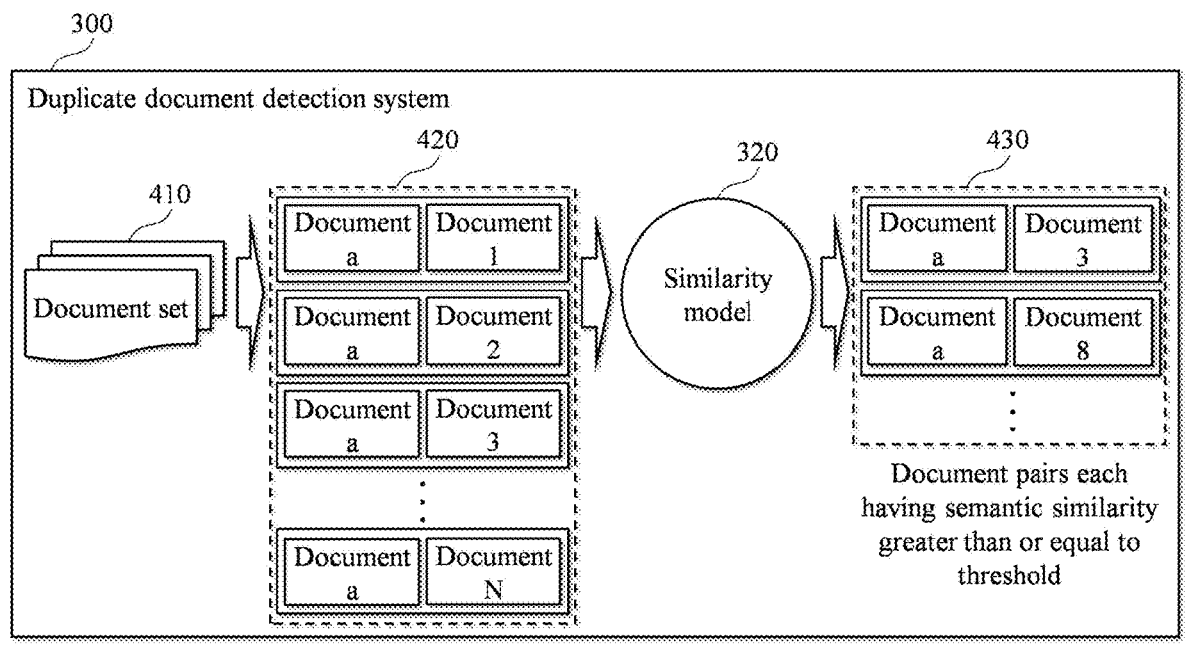
FIG. 4 illustrates an example of a duplicate document detection method according to some example embodiments.

FIG. 4 illustrates an example of a duplicate document detection process according to some example embodiments. The duplicate document detection system 300 may be implemented by the aforementioned computer apparatus 200 and may perform the following duplicate document detection process under control of the processor 220 included in the computer apparatus 200.

The duplicate document detection system 300 may manage pre-registered, or registered, document sets 410. Here, the document set 410 may be, for example, a set of documents pre-registered, or registered, to a server (e.g., the server 150) configured to provide a specific service. Here, the duplicate document detection system 300 may be included in (e.g., implemented by) the server and may provide a duplicate document detection service for the server. Alternatively, the duplicate document detection system 300 implemented by a separate physical apparatus (e.g., the server 160) may provide the duplicate document detection service to the server through communication with the server over the network 170. Here, in response to a request for registering a new document a, the duplicate document detection system 300 may detect a duplicate of the new document a from among the pre-registered, or registered, documents. For example, with the assumption that the document set 410 includes N pre-registered, or registered, documents including document 1 to document N, the duplicate document detection system 300 may generate document pairs 420 that each include a document a and a respective document of the document set 410. The duplicate document detection system 300 may sequentially input each of the document pairs 420 to the similarity model 320, and the similarity model 320 may determine and output a semantic similarity for each of the document pairs 420. In this case, the duplicate document detection system 300 may determine document pairs 430 each of which the semantic similarity is greater than or equal to a threshold as duplicate document pairs, and may determine whether to register the new document a based on a number of the duplicate document pairs. For example, if the number of duplicate document pairs is less than M, the duplicate document detection system 300 may register the new document a in response to a request for registering the new document a. On the contrary, if the number of duplicate document pairs is greater than or equal to M, the duplicate document detection system 300 may display CAPTCHA in response to the request for registering the new document a, and may prevent or reduce indiscriminate registration of a duplicate document. Here, registration of the new document a or displaying of the CAPTCHA may be performed in response to the request for registering the new document a. That is, a duplicate document detection for new documents may be performed in real time since a duplicate document detection method according to some example embodiments uses deep learning of learning a similarity between two documents instead of using a clustering algorithm, such as clustering documents. According to some example embodiments, the duplicate document detection system may block registration of a new document and/or display the CAPTCHA in response to detecting that the new document is a duplicate document. Blocking registration of the new document may include preventing or reducing display of the new document. According to some example embodiments, the duplicate document detection system may register and/or display the new document in response to detecting that the new document is not a duplicate document.

Although the example depicted in FIG. 2 illustrates a process of determining whether to register a new document depending on whether a duplicate document is detected, a process of detecting duplicate documents from among pre-registered, or registered, documents may be easily understood from the above description. For example, the duplicate document detection system 300 may generate document pairs for all of the documents included in the document set 410. Here, the generated document pairs may be subsets each having two elements (e.g., documents) among subsets of the document set 410. The duplicate document detection system 300 may input each of the generated document pairs to the similarity model 320, may calculate a semantic similarity for each of the document pairs, and may verify document pairs each of which the semantic similarity is greater than or equal to a threshold as duplicate documents.

According to some example embodiments, to minimize or reduce a false detection rate, whether a duplicate part is present between documents may be determined based on a condition in which a mathematical similarity calculated using a mathematical measure, and a semantic similarity according to some example embodiments, are combined. For example, a weighted sum for the calculated mathematical similarity and semantic similarity may be used as a final similarity between two documents.

FIG. 5 is a flowchart illustrating an example of a duplicate document detection method according to some example embodiments. The duplicate document detection method according to some example embodiments may be performed by the computer apparatus 200 that implements the aforementioned duplicate document detection system 300. According to some example embodiments, operations described herein as being performed by the computer apparatus 200, the processor 220 and/or the duplicate document detection system 300 may be performed by processing circuitry. The term 'processing circuitry,' as used in the present disclosure, may refer to, for example, hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. For example, the processing circuitry (e.g., the processor 220 of the computer apparatus 200) may be configured to execute a control instruction according to a code of at least one computer program, and/or a code of an OS, included in the memory 210. Here, the processor 220 may control the computer apparatus 200 to perform operations 510 to 550 included in the duplicate document detection method of FIG. 5 in response to a control instruction provided from a code stored in the computer apparatus 200.

Referring to FIG. 5, in operation 510, the computer apparatus 200 may extract, from a document database, a similar document pair set that includes a plurality of similar document pairs having the same attribute, or a similar attributes, (e.g., an attribute common to the set of documents that has the same or similar values in the set of documents) and a dissimilar document pair set that includes a plurality of randomly extracted dissimilar document pairs. For example, the document database may correspond to the document DB 310 of FIG. 3, and the similar document pair set and the dissimilar document pair set may correspond to the similar document pair set 330 and the dissimilar document pair set 340 of FIG. 3, respectively. Here, the attribute(s) may include at least one of an author of a document, a post section of the document, and/or a registration time range of the document. For example, when the author is defined as the attribute, two different documents of the same author, or similar authors, may be recognized as documents having the same attribute or similar attributes. As another example, when an author, a post section, and a 1-hour range are defined as attributes, two documents registered on the same post section, or similar post sections, by the same author, or similar authors, within one hour may be recognized as documents of the same attributes or similar attributes. Although a dissimilar document pair may include randomly extracted two documents, document pairs having the same attribute, or similar attributes, among the randomly extracted document pairs may be excluded or removed from the dissimilar document pair (e.g., from the dissimilar document pair set 340).

In operation 520, the computer apparatus 200 may calculate a mathematical similarity using a mathematical measure for each of the plurality of similar document pairs and each of the plurality of dissimilar document pairs. For example, the computer apparatus 200 may calculate the mathematical similarity using at least one of a cosine similarity, a Euclidean distance, and/or a Jaccard similarity as the mathematical measure.

In operation 530, the computer apparatus 200 may calculate a semantic similarity for each of the plurality of similar document pairs and each of the plurality of dissimilar document pairs by increasing the mathematical similarity calculated for each of the plurality of similar document pairs and by decreasing the mathematical similarity for each of the plurality of dissimilar document pairs. For example, the computer apparatus 200 may increase the mathematical similarity calculated for each of the plurality of similar document pairs through input to a first nonlinear function and may decrease the mathematical similarity calculated for each of the plurality of dissimilar document pairs through input to a second nonlinear function. In this case, the first nonlinear function and the second nonlinear function may be two nonlinear functions that meet a condition in which the first nonlinear function calculates a value greater than that of the second nonlinear function with respect to all of the same input values or all similar input values. As described above, the mathematical similarity for the similar document pair may be underestimated by the mathematical measure and the mathematical similarity for the dissimilar document pair may be overestimated by the mathematical measure. The computer apparatus 200 may calculate the semantic similarity by increasing the underestimated mathematical similarity and by decreasing the overestimated mathematical similarity. An increase level or a decrease level of the mathematical similarity may be determined based on a nonlinear function selected between the first nonlinear function and the second nonlinear function. According to some example embodiments, each of the first nonlinear function and/or the second nonlinear function may be designed, determined and/or selected through empirical study. According to some example embodiments, each of the increase level of the first nonlinear function and/or the decrease level of the second nonlinear function may be design parameters determined through empirical study.

In operation 540, the computer apparatus 200 may train a similarity model based on the plurality of similar document pairs, the plurality of dissimilar document pairs, and the semantic similarity. For example, the computer apparatus 200 may sequentially input each of the plurality of similar document pairs and each of the plurality of dissimilar document pairs to the similarity model, and may train the similarity model to minimize an MSE, and/or determine a lowest MSE, between an output value of the similarity model and a semantic similarity corresponding to an input document pair. That is, the similarity model may be trained to minimize or lower a loss by inputting an output value of the similarity model and a corresponding semantic similarity to a loss function as a correct answer score. Description related to the similarity model may refer to description related to the similarity model 320 made above with reference to FIGS. 3 and 4.

In operation 550, the computer apparatus 200 may detect a duplicate document using the similarity model.

According to some example embodiments, in operation 550, the computer apparatus 200 may extract document pairs from a document set for which a duplicate is to be detected and may calculate a semantic similarity of each of the extracted document pairs by sequentially inputting the extracted document pairs to the similarity model. Here, to extract document pairs (e.g., candidate document pairs) from the document set, the computer apparatus 200 may extract subsets each having two elements among subsets of the document set as document pairs. In this case, the computer apparatus 200 may determine document pairs, for each of which the calculated semantic similarity is greater than or equal to a preset or alternatively, given threshold, as duplicate documents. In this case, whether a duplicate document is present may be determined with respect to all of document pairs of the document set. According to some example embodiments, the threshold may be a design parameter determined through empirical study According to some example embodiments, in operation 550, the computer apparatus 200 may extract at least one document pair (e.g., candidate document pair) that includes a respective one of the documents of a document set including registered documents and a new document with respect to each of the documents of the document set (e.g., not included in the document set), in response to a request for registering the new document, may calculate a semantic similarity of each of the extracted document pairs (e.g., candidate document pairs) by sequentially inputting the extracted document pairs to the similarity model, and may determine document pairs (also referred to herein as a duplicate document determination), for each of which the calculated semantic similarity is greater than or equal to a preset or alternatively, given first threshold, as duplicate documents (e.g., as containing duplicate documents). Here, if a number of the document pairs determined as the duplicate documents is greater than or equal to a preset or alternatively, given second threshold, the computer apparatus 200 may determine the new document as a duplicate document. For example, the computer apparatus 200 may verify documents that duplicate a new document at a point in time at which the new document is registered and, if a number of the duplicate documents is greater than or equal to the preset or alternatively, given second threshold, may determine the new document as a duplicate document. In this case, the computer apparatus 200 may display a CAPTCHA instead of registering the new document and may prevent or reduce indiscriminate registration of duplicate documents. According to some example embodiments, each of the first threshold and/or the second threshold may be a design parameter determined through empirical study.

According to some example embodiments, it is possible to determine whether a duplicate part is present between documents based on a semantic similarity between the documents.

Conventional devices and methods measure a document similarity using a mathematical measure. However, such mathematical measures fail to account for semantic similarity, resulting in underestimation of the similarity of more similar documents and overestimation of the similarity of less similar documents. Accordingly, the mathematical measure-based similarity measurement of the conventional devices and methods is insufficiently accurate. Also, the conventional devices and methods compute the mathematical measure-based similarity measurement using clustering algorithms, resulting in excessive resource consumption (e.g., processor, memory, power and/or delay) at the time of computing the mathematical measure-based similarity measurement.

However, according to some example embodiments, devices and methods are provided for measuring a semantic similarity that compensates for the underestimation of the similarity of more similar documents, and overestimation of the similarity of less similar documents, of the mathematical measure-based similarity measurements. Accordingly, the semantic similarity measured by devices and methods of some example embodiments is more accurate than the mathematical measure-based similarity measurement of the conventional devices and methods. Also, according to some example embodiments, devices and methods are provided for training a similarity model using the semantic similarity. Thus, devices and methods according to some example embodiments compute the semantic similarity using the trained similarity model, thereby reducing resource consumption at computation time (e.g., processor, memory, power and/or delay) and enabling real time blocking of duplicate document registration.

The systems or apparatuses described above may be implemented using processing circuitry. For example, the apparatuses and the components described herein may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For simplicity, the description of a processing device is used as singular; however, one skilled in the art will appreciate that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and/or data may be embodied permanently or temporarily in any type of machine, component, physical equipment, virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable storage mediums.

The above-described methods according to some example embodiments may be configured in a form of program instructions performed through various computer devices and recorded in non-transitory computer-readable media. The media may also include, alone or in combination with the program instructions, data files, data structures, and the like. The media may continuously store computer-executable programs or may temporarily store the same for execution or download. Also, the media may be various types of recording devices or storage devices in a form in which one or a plurality of hardware components are combined. Without being limited to media directly connected to a computer system, the media may be distributed over the network. Examples of the media include magnetic media such as hard disks, floppy disks, and magnetic tapes; optical media such as CD-ROM and DVDs; magneto-optical media such as floptical disks; and hardware devices that are specially configured to store and perform program instructions, such as read-only memory (ROM), random access memory (RAM), flash memory, and the like.

Examples of other media may include recording media and storage media managed by an app store that distributes applications or a site, a server, and the like that supplies and distributes other various types of software. Examples of program instructions include both machine code, such as produced by a compiler, and files containing higher level code that may be executed by the computer using an interpreter.

While this disclosure includes some example embodiments, it will be apparent to one of ordinary skill in the art that various alterations and modifications in form and details may be made without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents.

What is claimed is:

1. A duplicate document detection method of a computer apparatus including processing circuitry, the method comprising:
    extracting, by the processing circuitry, a similar document pair set and a dissimilar document pair set from a document database, the similar document pair set including a plurality of similar document pairs having a common attribute, and the dissimilar document pair set including a plurality of dissimilar document pairs extracted randomly;
    calculating, by the processing circuitry, a mathematical similarity for each of the plurality of similar document pairs and each of the plurality of dissimilar document pairs using a mathematical measure to obtain a first plurality of mathematical similarities based on the plurality of the similar document pairs and a second plurality of mathematical similarities based on the plurality of dissimilar document pairs;
    calculating, by the processing circuitry, a semantic similarity for each of the plurality of similar document pairs and each of the plurality of dissimilar document pairs to obtain a first plurality of semantic similarities based on the plurality of similar document pairs and a second plurality of semantic similarities based on the plurality of dissimilar document pairs, each of the first plurality of semantic similarities being higher than a corresponding one of the first plurality of mathematical similarities, and each of the second plurality of semantic similarities being lower than a corresponding one of the second plurality of mathematical similarities;

training, by the processing circuitry, a similarity model based on the plurality of similar document pairs, the plurality of dissimilar document pairs, the first plurality of semantic similarities and the second plurality of semantic similarities to obtain a trained similarity model; and detecting, by the processing circuitry, a duplicate document using the trained similarity model, wherein the calculating the semantic similarity comprises
calculating the first plurality of semantic similarities by inputting the first plurality of mathematical similarities to a first nonlinear function, and
calculating the second plurality of semantic similarities by inputting the second plurality of mathematical similarities to a second nonlinear function, and
the first nonlinear function outputs a value greater than a value output by the second nonlinear function based on any value input to both the first nonlinear function and the second nonlinear function.

2. The method of claim 1, wherein the common attribute comprises at least one of an author of a document, a post section of the document, or a registration time range of the document.

3. The method of claim 1, wherein the training the similarity model comprises:
sequentially inputting each of the plurality of similar document pairs and each of the plurality of dissimilar document pairs to the similarity model as a respective input document pair; and
training the similarity model to minimize a mean squared error (MSE) between each respective output value of the similarity model and a corresponding semantic similarity among the first plurality of semantic similarities and the second plurality of semantic similarities corresponding to the respective input document pair.

4. The method of claim 3, wherein the training the similarity model to minimize the MSE comprises inputting the respective output value of the similarity model and the corresponding semantic similarity to a loss function using the MSE.

5. The method of claim 1, wherein the detecting the duplicate document comprises:
extracting a plurality of candidate document pairs from a document set in which a duplicate is to be detected;
calculating a respective semantic similarity of each of the plurality of candidate document pairs by sequentially inputting each of the plurality of candidate document pairs to the similarity model; and
determining one of the plurality of candidate document pairs for which the respective semantic similarity is greater than or equal to a threshold as including duplicate documents.

6. The method of claim 5, wherein the extracting the plurality of candidate document pairs comprises extracting a plurality of subsets among subsets of the document set as the plurality of candidate document pairs, each of the plurality of subsets having two elements.

7. The method of claim 1, wherein the detecting the duplicate document comprises:
extracting a plurality of candidate document pairs that each comprise a respective document among a plurality of registered documents and a new document in response to a request for registering the new document;
calculating a respective semantic similarity of each of the plurality of candidate document pairs by sequentially inputting each of the plurality of candidate document pairs to the similarity model;
determining one or more of the plurality of candidate document pairs for which the respective semantic similarity is greater than or equal to a first threshold as representing one or more duplicate document determinations; and
determining the new document to be the duplicate document based on a number of the one or more duplicate document determinations being greater than or equal to a second threshold.

8. The method of claim 7, further comprising:
displaying a Completely Automated Public Turing test to tell Computers and Humans Apart (CAPTCHA) instead of registering the new document in response to determining the new document is the duplicate document.

9. The method of claim 1, wherein the mathematical measure is at least one of a cosine similarity, a Euclidean distance, or a Jaccard similarity.

10. A non-transitory computer-readable record medium storing instructions that, when executed by processing circuitry, cause the processing circuitry to perform the method of claim 1.

11. The method of claim 1, further comprising:
blocking registration of the duplicate document.

12. A computer apparatus comprising:
processing circuitry configured to cause the computer apparatus to
extract a similar document pair set and a dissimilar document pair set from a document database, the similar document pair set including a plurality of similar document pairs having a common attribute, and the dissimilar document pair set including a plurality of dissimilar document pairs extracted randomly,
calculate a mathematical similarity using for each of the plurality of similar document pairs and each of the plurality of dissimilar document pairs using a mathematical measure to obtain a first plurality of mathematical similarities based on the plurality of the similar document pairs and a second plurality of mathematical similarities based on the plurality of dissimilar document pairs,
calculate a semantic similarity for each of the plurality of similar document pairs and each of the plurality of dissimilar document pairs to obtain a first plurality of semantic similarities based on the plurality of similar document pairs and a second plurality of semantic similarities based on the plurality of dissimilar document pairs, each of the first plurality of semantic similarities being higher than a corresponding one of the first plurality of mathematical similarities, and each of the second plurality of semantic similarities being lower than a corresponding one of the second plurality of mathematical similarities,
train a similarity model based on the plurality of similar document pairs, the plurality of dissimilar document pairs, the first plurality of semantic similarities and the second plurality of semantic similarities to obtain a trained similarity model, and
detect a duplicate document using the trained similarity model, the processing circuitry is configured to cause the computer apparatus to
calculate the first plurality of semantic similarities by inputting the first plurality of mathematical similarities to a first nonlinear function, and calculate the second plurality of semantic similarities by inputting the second plurality of mathematical similarities to a second nonlinear function, the first nonlinear function outputting a value greater than a value output by the second nonlinear function based on any value input to both the first nonlinear function and the second nonlinear function.

13. The computer apparatus of claim 12, wherein the processing circuitry is configured to cause the computer apparatus to:
sequentially input each of the plurality of similar document pairs and each of the plurality of dissimilar document pairs to the similarity model as a respective input document pair; and
train the similarity model to minimize a mean squared error (MSE) between each respective output value of the similarity model and a corresponding semantic similarity among the first plurality of semantic similarities and the second plurality of semantic similarities corresponding to the respective input document pair.

14. The computer apparatus of claim 12, wherein processing circuitry is configured to cause the computer apparatus to:
extract a plurality of candidate document pairs from a document set in which a duplicate is to be detected;
calculate a respective semantic similarity of each of the plurality of candidate document pairs by sequentially inputting each of the plurality of candidate document pairs to the similarity model; and
determine one of the plurality of candidate document pairs for which the respective semantic similarity is greater than or equal to a threshold value as including duplicate documents.

15. The computer apparatus of claim 12, wherein the processing circuitry is configured to cause the computer apparatus to:
extract a plurality of candidate document pairs that each comprise a respective document among a plurality of registered documents and a new document in response to a request for registering the new document;
calculate a respective semantic similarity of each of the plurality of candidate document pairs by sequentially inputting each of the plurality of candidate document pairs to the similarity model;
determine one or more of the plurality of candidate document pairs for which the respective semantic similarity is greater than or equal to a first threshold as representing one or more duplicate document determinations; and
determine the new document to be the duplicate document based on a number of the one or more duplicate document determinations being greater than or equal to a second threshold.

16. The computer apparatus of claim 12, wherein the processing circuitry is configured to cause the computer apparatus to:
train the similarity model by,
sequentially inputting each of the plurality of similar document pairs and each of the plurality of dissimilar document pairs to the similarity model as a respective input document pair, and
training the similarity model to minimize a mean squared error (MSE) between each respective output value of the similarity model and a corresponding semantic similarity among the first plurality of semantic similarities and the second plurality of semantic similarities corresponding to the respective input document pair.

17. The computer apparatus of claim 16, wherein the training the similarity model to minimize the MSE comprises inputting the respective output value of the similarity model and the corresponding semantic similarity to a loss function using the MSE.

18. The computer apparatus of claim 12, wherein the processing circuitry is configured to cause the computer apparatus to:
display a Completely Automated Public Turing test to tell Computers and Humans Apart (CAPTCHA); and
block registration of the duplicate document.

* * * * *